UNITED STATES PATENT OFFICE.

MELVIN SHAW, OF ABINGTON, MASSACHUSETTS.

IMPROVED COMPOSITION FOR DRESSING LEATHER.

Specification forming part of Letters Patent No. 34,530, dated February 25, 1862.

*To all whom it may concern:*

Be it known that I, MELVIN SHAW, of Abington, in the county of Plymouth and State of Massachusetts, have invented an Improved Upper-Leather Dressing, of which the following is a full, clear, and exact description and specification, setting forth the distinguishing features of my invention, and the manner in which I have carried it out.

In an "upper-leather dressing" to be used by curriers for finishing upper-leather and by manufacturers for blacking boots and shoes there are many requisites to make up a suitable article, which have not all been obtained in any "dressing" heretofore made with which I am acquainted. I will state the principal of these requisites. The dressing should give a uniform smooth finish, with a bright lively black color, while the leather should retain its original softness, showing little or no coating on its surface. The finish should be durable, and not easily defaced by handling, and not liable to mold when the leather is laid away. The dressing should be thin, and of easy application to the leather, should dry quickly, and should not be liable to sour or ferment when kept for a considerable time. All of these requirements are met by the improved dressing which constitutes the subject of my present invention.

That others skilled in the art may understand and use my invention, I will proceed to describe the manner in which I have carried it out.

First. To one gallon of soft water I add six ounces of best extract of logwood, heating the solution nearly to the boiling-point, (but prefer that it should not boil,) stirring it well until dissolved, then place in a separate vessel to cool.

Second. To one gallon of soft water I add six ounces of borax, and heat it, as before, nearly to the boiling-point, to dissolve the borax. I then add one and one-half pound of gum-shellac, adding it in small quantities, and stirring briskly, while adding, until the gum is thoroughly dissolved.

Third. I dissolve three-eighths of an ounce of bichromate of potash in half a pint of hot water in a vessel by itself.

Fourth. I add together the first and second preparations—viz., the solution of logwood and the shellac—by pouring the logwood solution into the shellac, stirring well until the two are mixed, and while yet warm I add the third solution, or that of bichromate of potash, stirring the whole briskly for some time. This mixture is now allowed to stand for twenty-four hours or more, until entirely cool, when I skim off whatever may have risen on top of it, and draw off the liquid for use.

Fifth. When this last mixture is put into cans for use I mix with it three or four ounces of concentrated water of ammonia or spirits of ammonia, and cork it up tightly. It is now ready to be applied to the leather.

The above dressing may be applied to the leather with a soft sponge, either by itself, giving the leather two coats of it, or it may be used in the following manner: To one portion of paste made of gum-tragacanth, dissolved in water, add an equal portion of my above-described dressing, mix well together, and let the mixture stand for three or four days previous to using it. Apply this mixture to the leather as a first coat or dressing, rubbing it well into the leather, and then apply a coat of the clear dressing first described.

The proportions of the above ingredients may be slightly varied to make the dressing thicker or thinner, as required; or it may have added to it some essence or oil to scent it; or the color may be varied by using a portion of prussiate of potash. The bichromate of potash may also be replaced by the neutral chromate.

What I claim as my invention, and desire to secure by Letters Patent, is—

A dressing for leather consisting of an alkaline solution of shellac, in combination with a solution of logwood.

MELVIN SHAW.

Witnesses:
SAM. COOPER,
P. E. TESCHEMACHER.